UNITED STATES PATENT OFFICE.

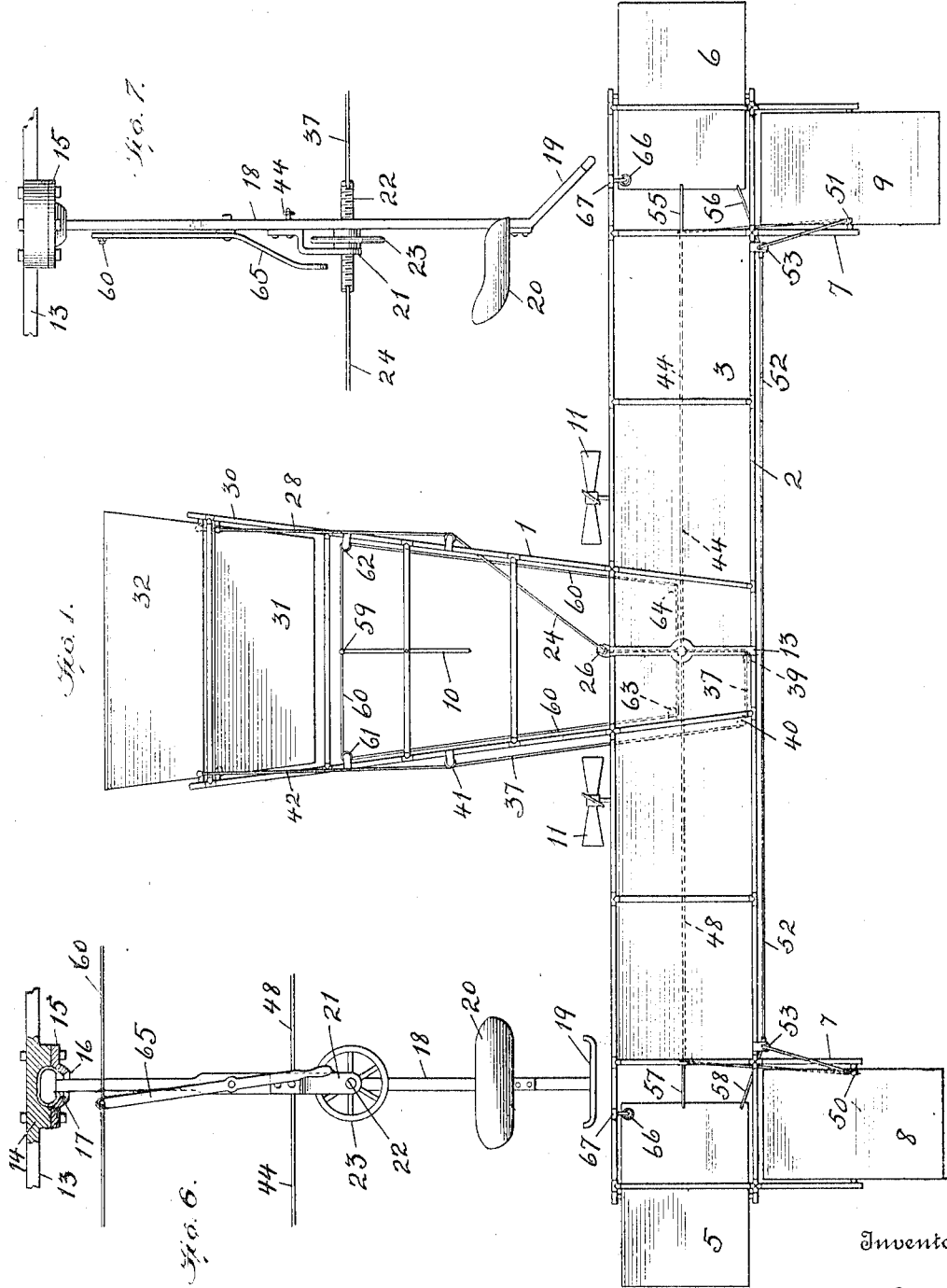

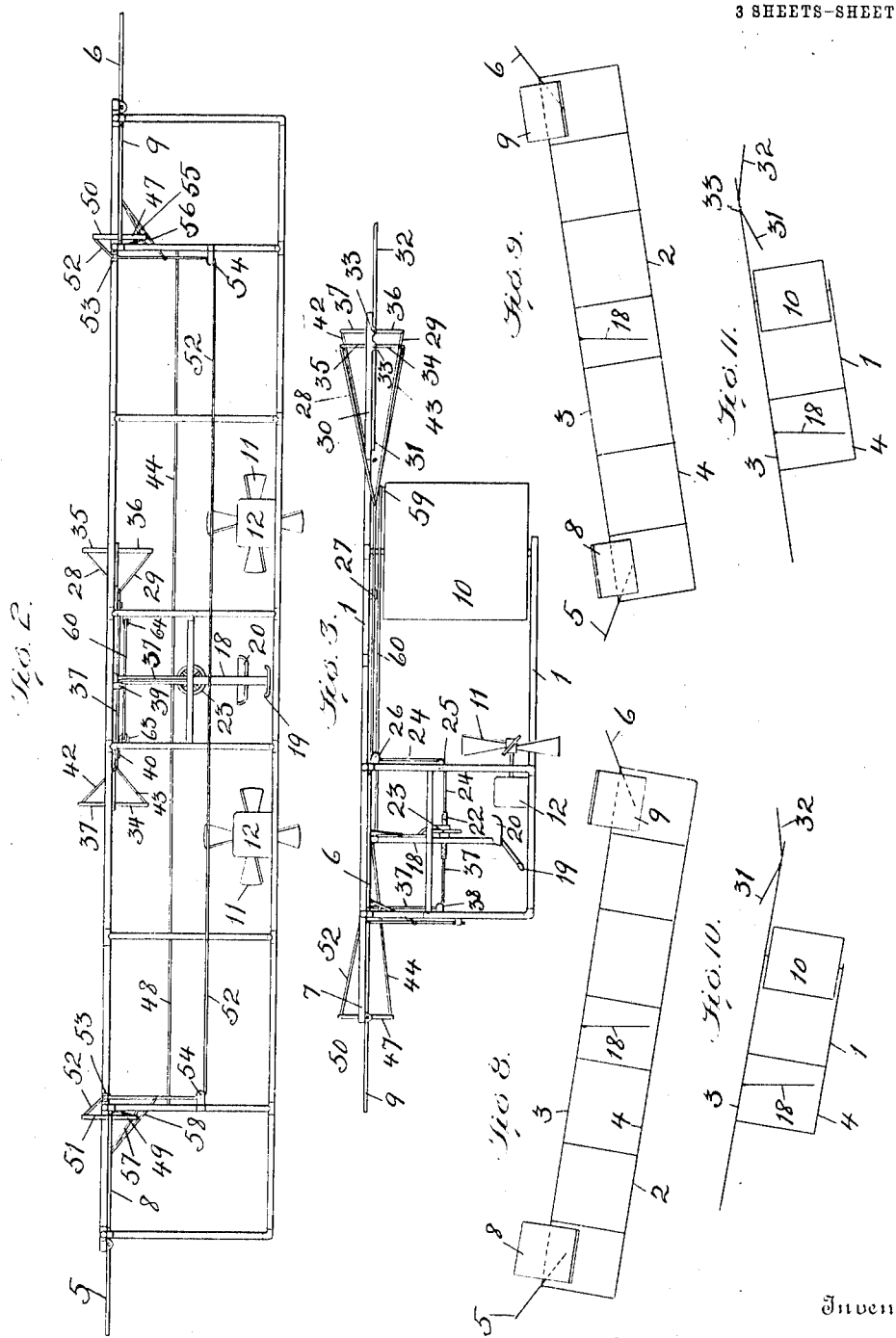

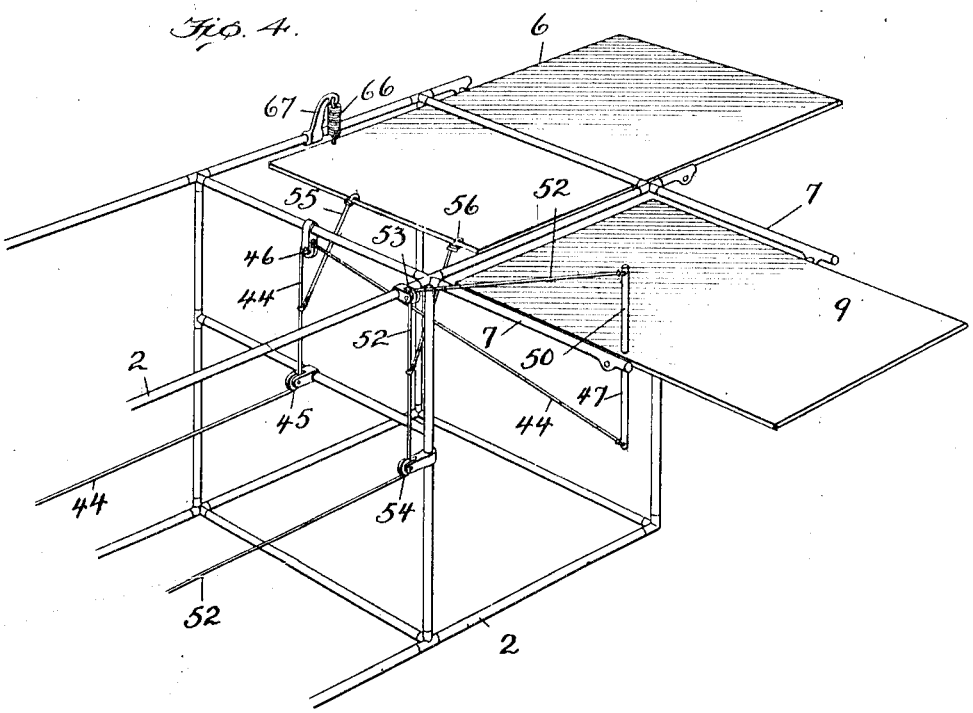
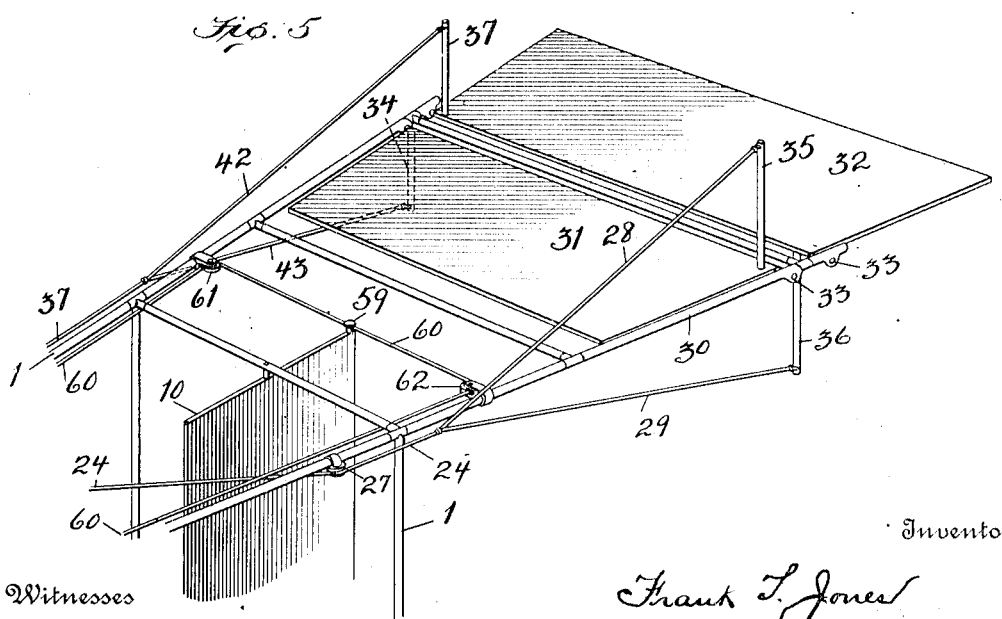

FRANK T. JONES, OF BALTIMORE, MARYLAND.

AEROPLANE.

1,106,099.

Specification of Letters Patent.

Patented Aug. 4, 1914.

Application filed November 17, 1910. Serial No. 592,780.

*To all whom it may concern:*

Be it known that I, FRANK T. JONES, citizen of the United States, residing at Baltimore, in the State of Maryland, have invented certain new and useful Improvements in Aeroplanes, of which the following is a specification.

This invention relates to improvements in aeroplanes and has for its object to provide improved means for automatically adjusting the balancing planes thereof whereby to relieve the aviator of all mental and physical exertion in maintaining the equilibrium of the machine and especially at moments when the machine is subjected to sudden and unexpected gusts of wind from the side, front or rear—often requiring prompt action on the part of the aviator that the latter is unable to give or in attempting to do so, does something that should not be done with costly and often fatal results.

The invention also has for its object to combine a plurality of independently pivoted balancing planes at desired locations on the machine with an improved universally-movable pendant member, and to connect said member with the pivoted planes whereby to automatically move the latter—some in one direction and others in another direction to effect a balancing of the machine when the latter tilts from a general horizontal plane.

With these objects in view the invention is illustrated in the accompanying drawings, wherein, Figure 1, shows a top plan of an aeroplane embodying the features of my invention; Fig. 2, a front elevation of the same; Fig. 3, a side elevation thereof; Fig. 4, an enlarged perspective detail of one end of the frame that sustains the upper and lower supporting planes and also of the pivoted side and front balancing planes carried thereon, and the connections with the latter to move the same from one position to another. Fig. 5, is a similar view of the rear outrigger, the rudder and pivoted tail planes with connections for moving the latter. Fig. 6, is a rear elevation of the pendant member to which the connections from the balancing planes are attached. Fig. 7, is a side elevation of the same. Figs. 8 and 9 are diagrammatic front elevations of the supporting planes and the balancing planes at the opposite ends thereof and shows the position of the latter planes when the supporting planes are tilted or inclined sidewise, and Figs. 10 and 11, are diagrammatic side views showing the positions of the tail balancing planes with respect to the supporting planes when the latter take an inclined position from front to rear.

In illustrating the invention I have shown the same in connection with a machine having a rear outrigger or frame, 1, and a cross-wise frame, 2, at the front. This latter frame carries upper and lower main supporting planes, 3, and, 4, respectively, which, as well as the frames, 1, and, 2, may be of any suitable or desired construction. The opposite ends of the cross-wise frame, 2, pivotally carry side-balancing planes, 5, and, 6, respectively, which are pivoted about midway between their ends,—the pivots being substantially parallel with the upper supporting plane, 3, and beyond the ends of the latter. At the ends the cross-wise frame, 2, carries forwardly-extending arms, 7, which project at right angles to the side-balancing planes, 6, and said arms sustain front balancing-planes, 8, and, 9, respectively which latter are also pivoted about midway between their ends and normally extend parallel with the upper main supporting-plane, 3. It will thus be seen that in the structure shown the crosswise frame, 2, carries two balancing planes, 5, and, 8, at one end and two similar planes, 6, and, 9, at the opposite end and that all of said balancing planes are pivotally carried by said frame so they may be inclined or tilted in an up and down direction with respect to the supporting planes 3 and 4.

The rear outrigger or frame, 1, carries the rudder, 10, which has a vertical or edgewise position and is pivoted so its front vertical edge may be turned toward one side or the other to change the direction of flight as usual.

The rear outrigger or frame, 1, is provided with an extension or tail frame, 30, which pivotally sustains tail-balancing planes, 31, and, 32, respectively, as best shown in Fig. 5. These tail-balancing planes, in the present instance are pivoted at), 33, at their adjacent longitudinal edges and plane, 31, has a depending arm, 34, and an upwardly-projecting arm, 35, while plane, 32, has a depending arm, 36, and an upwardly-projecting arm, 37, all for a purpose presently to be explained.

The propulsion of the machine is effected through the medium of suitable propellers, 11, driven by an engine, 12, of any approved design.

As hereinbefore stated the present invention relates particularly to the means for effecting the automatic movement of the balancing planes to maintain the equilibrium of the machine and by reference to Figs. 1, 6 and 7 it will be noted that the upper bars of the cross-wire frame, 2, in the present instance carry a horizontal bar or plate, 13, which extends fore and aft, immediately beneath the upper supporting plane, 3. At the center, this bar or plate is provided with a socket, 14, and a ring-plate 15, is bolted to the under side thereof and is provided with a central perforation, 16. The socket, 14, and ring-plate, 15, together receive a head, 17, that is carried on the upper end of a bar, 18,—thus the bar may hang pendantly from the circular bearing so its lower end may have a swinging movement fore and aft or sidewise. In the present instance the lower end of the pendant bar carries a forwardly-extending foot rest, 19, while a seat, 20, for the aviator is secured to said bar above said foot rest and consequently the bar in reality is a seat support.

By reference to Figs. 2 and 3 it will be seen that in the present instance the bar, 18, hangs pendantly and sustains the foot-rest and seat so the latter may move back and forth or edgewise as the machine inclines, and it is this movement that is utilized to effect a movement of the balancing planes by means of connections between them, as will now be described.

A bracket plate, 21, is secured to the rear side of the pendant bar, 18, and its lower end together with the bar forms a bearing for a short exteriorly-threaded round rod, 22. A hand-wheel, 23, screws into the round rod and is held from forward or backward movement thereon by having the opposite sides of its hub held between the bracket plate and the bar. Thus it will be seen that the hand wheel has position in a vertical plane and may be turned in either direction to move the threaded rod, 22, forwardly or rearwardly with respect to the bar, 18, and bracket plate. To the rear end of the threaded rod, 22, is attached a cable, 24, which passes under a pulley, 25, (see Fig. 3) then extends up and over a pulley, 26; then passes rearwardly around a pulley, 27, on the rear frame, 1, after which it divides and one branch, 28, connects with the upwardly-projecting arm, 35, of tail-balancing plane, 31, while the other branch, 29, connects with the depending arm, 36, of tail plane 32. By this arrangement it will be seen that the forward movement of the threaded rod, 22, effected by rotating the hand wheel, 23, in one direction will draw on cable, 24, and branches, 28, and, 29, and consequently the free longitudinal edges of both tail-balancing planes, 31, and, 32, will be lowered as seen in Fig. 11, for a purpose presently to be explained.

By referring to Figs. 1, 2, 3 and 5 it will be seen that the front end of the threaded rod, 22, is connected by a cable, 37, which passes under a pulley, 38; then up to and around a pulley, 39, beneath the upper supporting plane; then laterally and around a pulley, 40, from which it passes to the rear outrigger or frame, 1, and over a pulley, 41, and passing this latter pulley said cable divides,—one branch, 42, connecting the upwardly-projecting arm, 37, or tail-plane, 32, and the other branch, 43, being connected with the depending arm, 34, of the tail plane, 31. These connections of cable, 37, to the tail planes, 31 and, 32, enable the latter to be turned up, as seen in Fig. 10, when the rod, 22, is drawn rearwardly by turning the hand-wheel, 23. It will therefore be understood that the tail planes, 31, and, 32, have a connection from the upper side of one and the lower side of the other to one side of the movable seat support and another connection from the upper side of one plane and the lower side of the other plane to the other side of the movable seat support and that when one connection is shortened to move said planes in one direction the other connection will be elongated to permit those planes to move in the drawn direction. In other words, there is a continuous connection between the two tail-balancing planes, 31, and, 32, and the movable seat support.

By referring to Figs. 6 and 7 it will be noted that the seat-carrying support, which in the present instance is the bar, 18, has a cable, wire or other flexible connection, 44, attached thereto and by referring to Figs. 2 and 4 it will be seen that this cable, 44, extends parallel with and beneath the main supporting plane, 3, and to one end of the cross-wise frame, 2, where it passes beneath a pulley, 45; then extends upwardly and over a pulley, 46, and from which latter it passes forwardly and beneath the front balancing plane, 9, where it connects with a depending arm, 47, that is carried by the frame of that plane, 9. Another cable or wire, 48, has its end attached to the seat-carrying support and extends toward the opposite end of the cross-wise frame, 2, (see Figs. 1 and 2) where it passes up and around properly-located pulleys, similar to pulleys, 45, and, 46, and connects with a depending arm, 49, at the under side of the front-balancing plane, 8. It will thus be seen that the under side arm, 47, of the front-balancing plane, 9, at one end of the cross-wise frame is connected by the cables, 44, and, 48, through the seat support with the under-side arm, 49, of the front-balancing plane, 8, at the opposite end of the said cross-wise frame. In addition to these connections between the seat support and the under side of the balancing planes, 8, and, 9, said planes have upwardly-projecting arms, 50, and, 51, respectively which are connected direct by means of a suitable cable, 52, that passes over pulleys, 53, and, 54, and which extends across the front of the frame, 2, as clearly seen in Figs. 2 and 4.

From the foregoing explanation it will be understood that the depending arms, 49, and, 47, of the front-balancing planes, 8, and, 9, are connected through the movable seat support and that the upwardly-projecting arms, 51, and, 50, of said planes, 8, and, 9, are also connected,—thus insuring the simultaneous movement of said planes whenever the position of the seat is altered with respect to the opposite ends of the cross-wise frame, 2, as when the machine cants or inclines as shown in Figs. 8 and 9, of the drawing.

By reference to Figs. 1 and 4 of the drawings it will be seen that both the cables, 44, and, 52, have branches, 55, and, 56, respectively which connect said cables with the side-balancing plane, 6, and that similar branches, 57, and, 58, extend from cables, 48, and, 52, and connect the side-balancing plane, 5, with said cables. Suitable springs, 66, are carried by brackets, 67, on the frame, 2, which connect with the side balancing planes, 5, and, 6, to normally hold those planes in a position parallel with the upper supporting plane, 3. By means of these branches the side-balancing planes, 5, and, 6, will be tilted simultaneously with the tilting of the front-balancing planes, 8, and, 9, as shown in Figs. 8 and 9 of the drawings.

The rudder, 10, as heretofore explained is pivotally mounted in the rear outrigger or frame, 1, and its upper edge, in the present instance, has a lug, 59, to which the steering cable, 60, is attached. This cable, in the present instance, passes around pulleys, 61, and, 62, respectively, and then extends forwardly and passes around pulleys, 63, and, 64, shown in broken lines in Fig. 1 and then connects with the upper end of a pivoted steering lever, 65, which may be carried on the pendant bar, 18, as shown in Figs. 6 and 7.

From the foregoing explanation it is to be understood that the aviator on the seat support, 20, will always maintain an upright position and that in maintaining this position while the main supporting planes, 3, and, 4, tilt or incline the pivoted balancing planes are shifted and effect a righting of the machine automatically. It will also be seen that the tail-balancing planes are also automatically shifted upon the machine taking an inclined position in a direction fore and aft and consequently if while making an ascent the engine should stop the tail planes would be automatically shifted to prevent a backward descent.

In illustrating the invention it is to be understood that no attempt has been made to illustrate every detail or all the necessary parts of the machine but only those elements are shown as are deemed necessary to properly describe the invention.

Having thus described my invention what I claim and desire to secure by Letters Patent is,—

1. The combination with a frame, of one or more supporting planes on said frame, an equilibrium plane and an aileron pivotally mounted adjacent one another in each side of the supporting plane so as to normally extend in the same plane with the latter, and having their axes at right-angles to one another, and means to simultaneously actuate the said equilibrium planes and ailerons at opposite sides, in relatively opposite directions whereby the former may be moved to slope toward one another at an inverted dihedral angle.

2. The combination with a frame, of one or more supporting planes on said frame, a pair of equilibrium planes pivotally mounted at a point a greater distance from their outer side edges than from their inner side edges, and mechanism for simultaneously moving the inner edges of both the equilibrium planes downwardly and simultaneously moving both of the outer edges upwardly.

3. The combination with a frame, of one or more supporting planes on said frame, a pair of equilibrium planes pivotally mounted at a point a greater distance from their outer side edges than from their inner side edges, mechanism for simultaneously moving the inner edges of both the equilibrium planes downwardly and simultaneously moving both of the outer edges upwardly, a pair of pivotally-mounted ailerons, and connections between said ailerons and said mechanism adapted to simultaneously tilt said ailerons in opposite directions with the movement of said equilibrium planes.

4. The combination with a frame, of one or more supporting planes on said frame, a pair of equilibrium planes pivotally mounted so as to swing about longitudinal axes, a pair of ailerons pivotally mounted so as to swing about transverse axes, and mechanism for simultaneously tilting the major portion of said equilibrium planes upward and inclining said ailerons in opposite directions.

5. In an aeroplane the combination with the horizontal upper and lower supporting planes, of a side and front balancing plane, at each end of the said upper supporting plane; a depending aviator-support movable between the upper and lower supporting planes; connections between the aviator-support and the side and front balancing planes at one end of the supporting plane; connections between the aviator-support and the side and front balancing planes at the other end of the supporting plane, tail planes, and connections between the aviator-support and the said tail planes and said connections having adjusting means thereon.

6. In an aeroplane the combination with the cross-wise frame of rectangular shape, of an upper and lower supporting plane carried by the frame; front and side planes pivotally carried at each end of the cross-wise frame; a bar pivotally sustained by its upper end between the said upper and lower planes; an adjustable screw rod carried by the said bar; connections between the front and side planes at each end of the cross-wise frame and the said bar; a second frame extending at right angles from the cross-wise frame; two balancing planes having parallel adjacent edges pivotally sustained by the second frame and connections between the said two balancing planes and to opposite ends of the adjustable screw rod on the said bar.

In testimony whereof I affix my signature in presence of two witnesses.

FRANK T. JONES.

Witnesses:
  CHARLES B. MANN, Jr.,
  G. FERDINAND VOGT.